United States Patent [19]

Rebmann et al.

[11] 4,321,115

[45] Mar. 23, 1982

[54] METHOD AND DEVICE FOR PROVIDING A CONTINUOUS MEASURED SUPPLY OF ALUMINA TO AN ELECTROLYTIC CELL

[75] Inventors: Hans J. Rebmann, Sion; Theo Mueller, Moehlin, both of Switzerland

[73] Assignee: Swiss Aluminium Ltd., Chippis, Switzerland

[21] Appl. No.: 124,598

[22] Filed: Feb. 25, 1980

[30] Foreign Application Priority Data

Mar. 2, 1979 [CH] Switzerland ............... 2064/79

[51] Int. Cl.$^3$ .............................................. C25C 3/14
[52] U.S. Cl. ........................................ 204/67; 204/245
[58] Field of Search ................... 204/67, 243 R–247

[56] References Cited

U.S. PATENT DOCUMENTS

| 3,006,825 | 10/1961 | Sem | 204/245 X |
| 3,371,026 | 2/1968 | Kiley et al. | 204/245 |
| 3,681,229 | 8/1972 | Lowe | 204/245 X |
| 3,839,167 | 10/1974 | Sleppy | 204/245 X |
| 4,049,529 | 9/1977 | Golla | 204/245 X |

FOREIGN PATENT DOCUMENTS

| 49-29804 | 8/1974 | Japan | 204/245 |
| 326246 | 2/1972 | U.S.S.R. | 204/245 |

Primary Examiner—Delbert E. Gantz
Assistant Examiner—Donald R. Valentine
Attorney, Agent, or Firm—Bachman and LaPointe

[57] ABSTRACT

A device for feeding measured amounts of alumina to the break in the crust on an electrolytic cell is such that in a stationary channel there is a transporting facility which is connected to a power drive facility and to an alumina silo. The channel is a feed pipe for a piston arrangement which is situated under an inlet opening from the silo and features at least one opening or chamber as a space for a limited amount of alumina to be fed to the cell. This space is delimited by a blocking piston and a feed piston. The width of this space can however be varied and, if desired, can correspond to the width of the inlet opening and an outlet opening which is laterally displaced with respect to the inlet.

If more feeding chambers are desired, these are formed by a plurality of blocking pistons and feeding pistons. The piston arrangement is connected via rods to a, preferably pneumatic, power drive and can be moved back and forwards. If the outlet lies below the inlet, then the piston system can be rotated about its axis by the power drive. The piston system features one or more openings or chambers between the inlet and outlet openings.

The outlet connects up to a funnel which guides the alumina to the break in the electrolyte crust.

15 Claims, 4 Drawing Figures

METHOD AND DEVICE FOR PROVIDING A CONTINUOUS MEASURED SUPPLY OF ALUMINA TO AN ELECTROLYTIC CELL

BACKGROUND OF THE INVENTION

The invention relates to a device for supplying measured quantities of alumina to the break in the crust of an electrolytic cell. The said device features a moving transporting facility which is situated in a stationary channel and is connected to a power drive facility and an alumina silo.

Devices for providing a continuous supply of alumina to electrolytic cells for fused salt electrolysis of alumina have been known for about 50 years. These devices resulted from the knowledge that alumina has to be fed to the bath in quantities corresponding to the amount of aluminum deposited at the cathode. It was therefore an early idea to combine the facility for feeding alumina to the cell with one for supplying measured quantities thereof. In the known devices the alumina is fed by means of a feeding screw and compressed air, a feeding screw and piston compressor, or by a scattering method. Other known methods of feeding alumina is by means of gravity feeders and fluidizing channels.

With the known feeding devices the place of feeding alumina to the cell varies between feeding through the anodes themselves, having the facility directly on the anode (in particularly with Söderberg pots), or having the alumina fed at some other place of choice on the cell.

The disadvantage of the feeding devices known up to now lies in particular in the complexity of construction, and in the cost of manufacturing such devices. Screw feed units in particular require a continuously turning motor which is electrically driven. This represents a considerable risk factor when used on electrolytic cells.

Feeding screws must have a certain (even if minimal) distance between them and the surrounding walls in order to have freedom to turn. Alumina can gather in these spaces, and, especially if it is the kind which is not completely dry, this can lead to sticking and therefore considerable interruptions in production.

Furthermore, adjusting the amount to be fed to the cell is difficult and inaccurate with a screw feed device as the spaces between any two threads of the screw do not fill up uniformly. This can therefore often result in too little alumina being fed to the cell and consequently more frequent anode effects, or too much being fed, which leads to uneconomic operation of the cell.

It is therefore an object of the invention to develop a device for feeding measured quantities of alumina to the break in the crust on an electrolytic cell, whereby the disadvantages of the known feeding devices are avoided.

SUMMARY OF THE INVENTION

This object is achieved by way of the invention in that a piston system or arrangement featuring at least one opening or chamber as measured feeding space is provided in a feed pipe below an inlet opening.

This device is of simple construction and insensitive to external influences.

It is made up basically of four elements viz., an alumina silo, a feed pipe containing a piston arrangement, a power drive facility and a funnel which catches the alumina and leads to the break in the crust.

The alumina silo tapers to an inlet pipe which joins up with an opening in the feed pipe. Inside this feed pipe there is a piston arrangement or system which is connected to a power drive facility by means of rods. On the opposite side of the alumina silo, the funnel surrounds an outlet in the wall of the feed pipe on the side opposite the inlet to the feed pipe.

A basic advantage of the invention lies in the use of the piston arrangement which can move inside the feed pipe, the design and mode of operation of which is determined by the number of inlet and outlet openings and their position with respect to each other.

One version of the piston system comprises a blocking piston and a feeding piston with the measured space between them. The width of this space can, if desired, be equal the diameter of the inlet and/or outlet opening in the feed pipe. This piston system is moved backwards and forwards in the direction parallel to its central axis by means of a, preferably pneumatically, controlled drive facility and an arrangement of rods connecting both pistons and the drive mechanism. The inlet and outlet openings are therefore usefully displaced laterally with respect to each other and on opposite sides of the feed pipe. The mode of operation of this feeding device is such that in the starting position the feeding space lies below the inlet opening so that alumina can flow out of the silo via the inlet pipe, through the inlet opening into the feeding space.

If the drive facility is put into motion, the rods slide the blocking piston, the feeding piston and the alumina in the spce between these over the outlet. At the same time the blocking piston closes off the inlet opening. The alumina falls through the outlet opening into the funnel leading to the break in the crust.

The invention also embraces a device in which the wall of the feed pipe features a plurality of inlet and/or outlet openings. If an outlet opening is provided on each side of an inlet opening, but on the opposite side of the feed pipe, then the piston system comprises a blocking piston and two feeding pistons arranged such that, when the space between the blocking piston and one of the feeding pistons lies over an outlet opening, the other space formed by the blocking piston and the other feeding piston is open to the inlet opening. This device makes double charging of the cell possible, if this is desired.

A further advantage of the device is that, due to the variable position of the pistons on the rods, with respect to each other, the size of charge being fed to the cell can be set very exactly by the size of the feeding space. Usefully, therefore, the piston arrangement can also be exchanged so that the amount of alumina being fed can be varied in accordance with the kind of alumina available.

It is also a feature of the invention that the shape of the pistons and their attachment to each other can also be varied. Preference is given to a round shape. However, for different feed pipe geometries, pistons of different shapes can be used. The connections from the blocking piston and closing pistons can be effected by means of part of the rod system on the central axis of both pistons or by means of connecting pieces on the outer edges of the pistons.

If the inlet and outlet openings lie opposite each other, then the piston system is of a different design. In that case the system can be rotated about its central axis by a drive facility which, if desired, is vertical to the piston system. This arrangement features, between inlet and outlet openings, at least one opening or chamber which forms the feeding space. The size of this chamber is, in particular, determined by the piece which joins the two parts of the piston arrangement. The chamber can e.g. be situated about the central axis of the piston so that there are two half-moon-shaped walls left. If with this design the piston arrangement is rotated about the central axis, one half-moon-shaped wall blocks off the inlet opening while the other blocks off the outlet. By turning further the inlet and outlet openings are exposed again so that the alumina, depending on the angle of turning, can flow unhindered through the chamber, the inlet and outlet openings. This rotational movement usefully takes place quickly about 90°, the time the chamber spends below the inlet and above the outlet determining the amount of alumina to be fed each time.

Another version makes use of the reverse arrangement of the chamber or opening. Both piston parts of the piston arrangement remain in the piston axis, joined by a dividing wall which is wide enough that it can block off both the inlet and the outlet openings. The dividing wall separates two half-moon-shaped spaces or chambers. If the piston rotates about the central axis, then one space is filled with alumina. On rotating further, the inlet and outlet openings are blocked off by the dividing wall and then exposed again—whereupon the alumina flows into the other half-moon-shaped chamber while the other one empties itself via the outlet opening.

The outlet openings are, if desired, surrounded by a funnel which has an outlet at its lower end leading to the break in the crust on the cell. Usefully then, one wall of the funnel is vertical to the break in the crust and the other is inclined to give optimum flow to the alumina. This allows the alumina to be fed to the break in the crust.

BRIEF DESCRIPTION OF THE DRAWINGS

Further advantages, features and details of the invention are revealed in the following description of preferred exemplified embodimens and with the help of the drawings viz.

DETAILED DESCRIPTION

Figure 1:
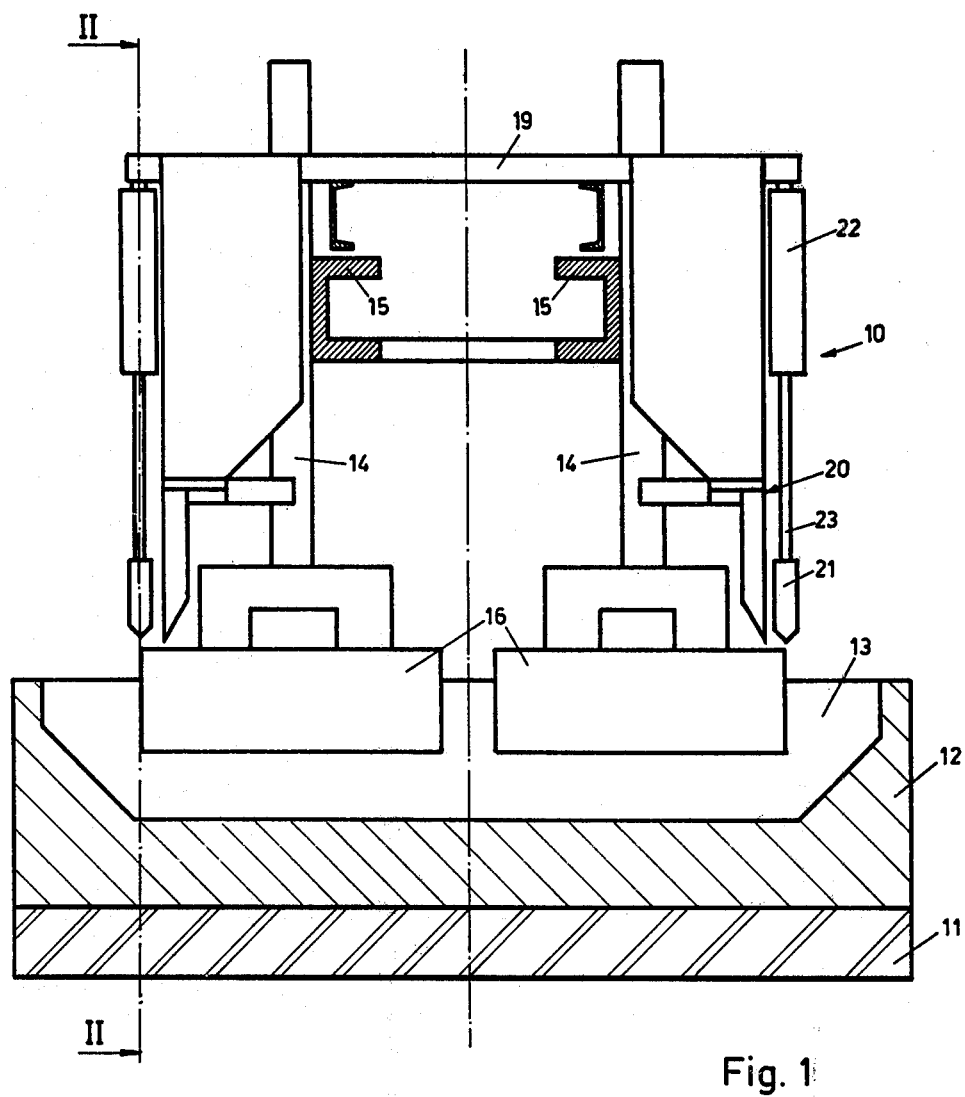
FIG. 1: A cross section through an electrolytic device.

The electrolytic reduction cell 10 shown schematically in FIG. 1 comprises a cathodically polarized tank 12 which stands on a cell base 11 and contains the electrolyte 13 into which the anode pair 16 dip, suspended from anode bars 14 which are secured to an anode beam 15.

Figure 2:
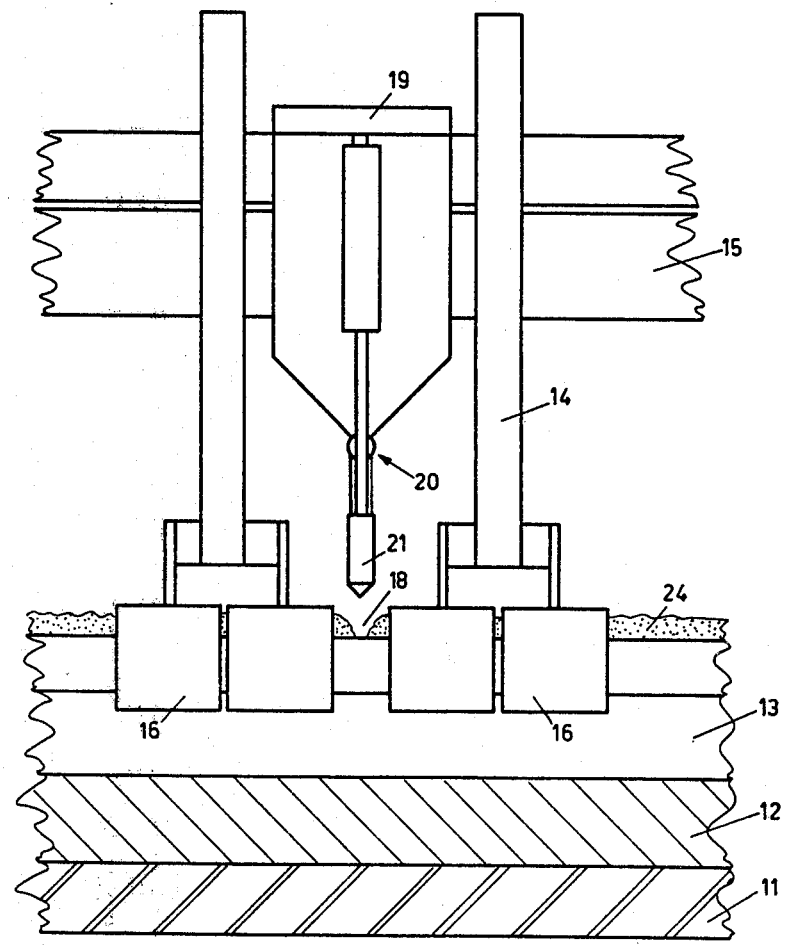
FIG. 2: A view of part of the electrolytic cell in FIG. 1 shown here sectioned along line II—II in FIG. 1.

By displacing the anode bars 14 which are releasably attached to the anode beam 15, a space 18 (FIG. 2) is formed between the two neighboring anodes. An alumina feeding device 20 and crust breaker 21 are installed over that space 18, if desired mounted such that they can be moved on a transverse beam 19.

The crust breaker 21 is connected via a rod 23 to a drive mechanism 22, preferably of the pneumatic type, by means of which it is moved down to strike the crust 24 on the electrolyte 13.

Figure 3:
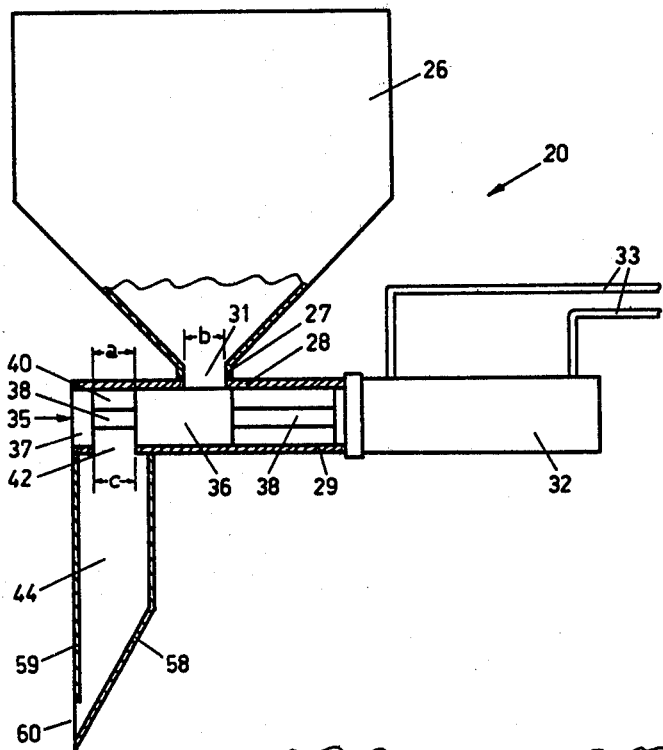
FIG. 3: A cross section through a feeding device.

The device 20 in FIG. 3 for feeding alumina to the cell comprises an alumina silo 26 which tapers down like a funnel to an inlet pipe 27. The inlet pipe 27 is situated on a wall 28 of feed pipe 29 at an opening of width b in wall 28.

A power drive facility 32, which is controlled—preferably pneumatically—by pipelines 33, is fitted on to the feed pipe 29 and moves the piston system 35 in the feed pipe 29. The piston system 35 comprises a blocking piston 36 which blocks off the inlet 31, and a feeder piston 37 such that the end faces of both pistons delimit a space 40 the width a of which can be altered. Both pistons are connected by a rod 38 to the power drive facility 32.

To fill space 40, the blocking piston 36 is pulled back by the power drive facility 32 via rod 38 until the space 40 lies under the inlet 31. The alumina can then flow from the silo, through the inlet pipe 27 and opening 31 into space 40. The countermovement of the drive facility 32 pushes the filled chamber 40 until it lies above an outlet 42 of width c provided in the wall of feed pipe 29 on the opposite side from and displaced with respect to inlet 31, whereupon the blocking piston closes off the inlet opening 31. The contents of chamber 40 fall through outlet 42 into funnel 44 one wall of which is inclined to give optimum flow to the alumina and, together with another wall 59, combines to form the feed opening 60.

Figure 4:
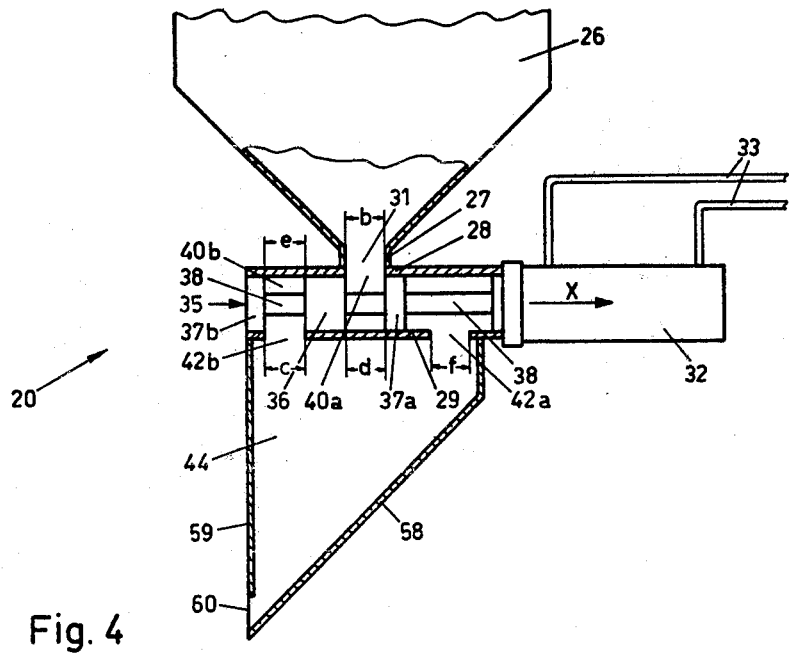
FIG. 4: Another version of the feeding device shown in FIG. 3.

FIG. 4 shows a feeding device 20 in which on both sides of a blocking piston 36 there are feeder pistons 37a and 37b arranged such that pistons 37a and 37b form spaces 40a and 40b of widths d and e respectively. The blocking off piston 36 and pistons 37a and 37b are connected to a power drive facility 32 via rods 38. On the side facing inlet 31 and displaced laterally on either side of that inlet 31 are outlets 42a and 42b of widths c and f respectively. In the position shown in FIG. 4 the space 40a between the blocking off piston 36 and feeder piston 37a is being filled with alumina from the silo 26 via inlet pipe 27. If the drive facility 32 moves the rods 38 in direction x, the chamber 40a is moved over the outlet 42a and empties itself into the funnel 44. At the same time chamber 40b is moved under inlet 31 and filled from silo 26 via inlet pipe 27. With the movement in the opposite direction the chamber 40b is pushed over outlet 42b and can empty itself there while chamber 40a again comes under inlet 31 and is filled with alumina from silo 26.

Figure 5:
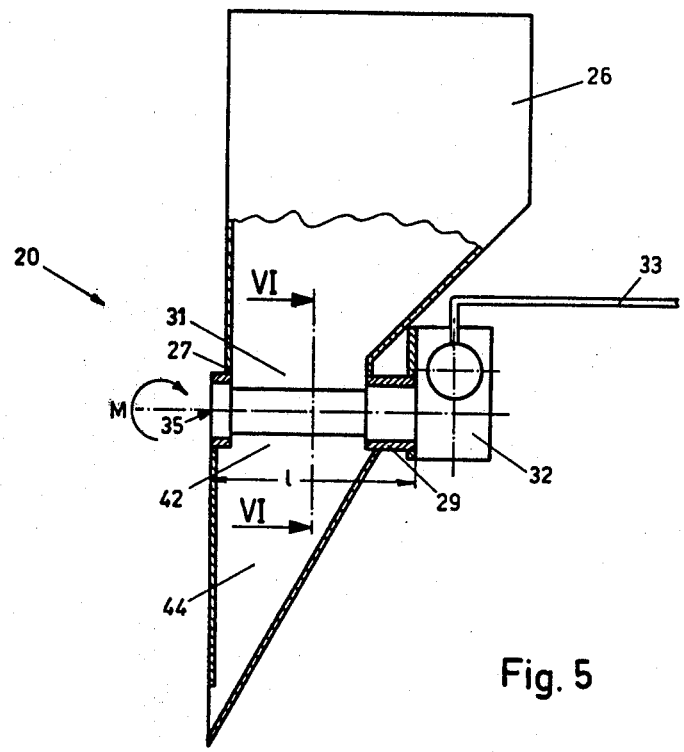
FIG. 5: A further version of the feeding device shown in FIG. 3.

In the case of the feeding device 20 shown in FIG. 5 the outlet 42 lies opposite the inlet 31. Between these, in the feed pipe 29 and, if desired, extending the whole length (1) there is a piston system 35 which is connected to drive facility 32 which rotates the piston arrangement 35 about its axis M. Between outlet 42 and inlet 31, the piston system is provided with an opening or chamber 49 (FIG. 6) which is delimited by two half-moon-shaped walls 50. As a result of a rotational movement in direction z the two half-moon-shaped walls 50 close off the inlet 31 and the outlet 42. On rotating further in direction z the opening 49 forms, together with the inlet pipe 27, the inlet opening 31 and the outlet opening 42, a channel through which the alumina from the silo can, if desired, flow into the funnel 44.

Figure 6:
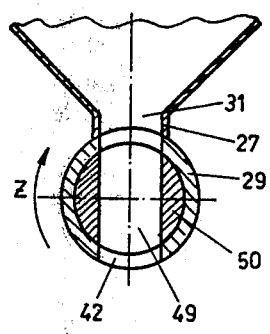
FIG. 6: An enlarged detail of one version of a feeding device sectioned along line IV—IV. An enlarged detail of an alternate version of a feeding device sectioned along line IV—IV.
Figure 7:
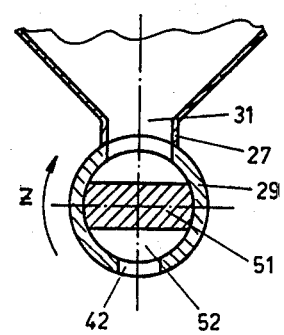

According to a second embodiment shown in FIG. 6, the piston system 35 features two half-moon-shaped chambers 52 between the inlet 31 and outlet 42. These chambers 52 are separated by a dividing wall 51 lying on the axis M of the piston system. By rotating the piston 35 in direction z, one of the chambers 52 comes to rest under the inlet 31, while the other can empty itself via the outlet 42. On turning further in direction z by about a further 90° the inlet 31 and the outlet 42 are closed off by the dividing wall 51.

What is claimed is:

1. A device for feeding measured amounts of alumina to the break in the crust on an electrolytic cell which comprises: an alumina silo, a stationary channel in the form of a feed pipe communicating with said silo by means of an inlet opening and having an outlet opening to the cell, and a movable piston arrangement in said channel positioned under said inlet for providing measured amounts of alumina from said inlet opening to said outlet opening to be fed to the cell, a feeding space defined by said piston arrangement, wherein said piston arrangement has a first operative position to receive a measured amount of alumina in said feeding space from said silo and a second operative position to discharge said measured amount of alumina from said feeding space to the cell via said outlet opening, and wherein the piston arrangement comprises at least one blocking piston and at least one feeding piston facing each other, with the facing ends of the blocking piston and the feeding piston delimiting the feeding space.

2. A device according to claim 1 wherein said piston arrangement includes a moving transporting facility situated in said channel and a power drive facility connected to said moving transporting facility.

3. A device according to claim 2 wherein the width (a) of the feeding space corresponds to the width (b) of the inlet.

4. A device according to claim 3 wherein the width (a) of the feeding space can be varied.

5. A device according to claim 2 wherein said feed pipe is laterally displaced with respect to said inlet opening, and including an outlet opening, the width (c) of which corresponds to the width (b) of the inlet opening.

6. A device according to claim 5 in which the piston arrangement can be moved via said power drive facility and including rods connected thereto, so that the feeding space can be moved from the inlet opening to the outlet opening.

7. A device according to claim 2 in which the piston arrangement is made up of a blocking piston and two feeding pistons such that the end faces of the feeding pistons form adjustable feeding spaces together with the end faces of the blocking piston.

8. A device according to claim 7 in which the blocking piston and two feeding pistons are attached by rods and movable such that one of the feeding spaces lies over an outlet when the other space is open to the inlet opening.

9. A device for feeding measured amounts of alumina to the break in the crust on an electrolytic cell which comprises: an alumina silo, a stationary channel in the form of a feed pipe communicating with said silo by means of an inlet opening and having an outlet opening to the cell, and a movable piston arrangement in said channel positioned under said inlet for providing measured amounts of alumina from said inlet opening to said outlet opening to be fed to the cell, a feeding space defined by said piston arrangement, wherein said piston arrangement has a first operative position to receive a measured amount of alumina in said feeding space from said silo and a second operative position to discharge said measured amount of alumina from said feeding space to the cell via said outlet opening, with said outlet opening provided in the feed pipe below the inlet opening and wherein the piston arrangement with piston axis (M) in said feed pipe featuring at least one opening or chamber between the inlet and the outlet and connected to a power drive facility by means of which it can be rotated about the axis (M).

10. A device according to claim 9 in which said opening or chamber is delimited by two half-moon-shaped walls.

11. A device according to claim 9 in which in the axis (M) of the piston arrangement there is a dividing wall which forms two half-moon-shaped feeding spaces.

12. A method for feeding measured amounts of alumina to the break in the crust in an elecrolytic cell which comprises: providing an alumina silo containing alumina to be fed to the cell; feeding alumina from said silo to a feed pipe communicating with said silo by means of an inlet opening in said pipe; providing an outlet opening on said feed pipe communicating with said cell; and transferring measured amounts of alumina from said inlet opening by means of a movable piston arrangement to said outlet opening for feeding to said cell, providing a feeding space defined by said piston arrangement, wherein a measured amount of alumina is fed to said feeding space in a first operative position of said piston arrangement and wherein said measured amount of alumina is fed from said feeding space to the cell via said outlet opening in a second operative position of said piston arrangement, with said measured amount of alumina being fed to a space defined by two pistons, and transferred from said space by movement of said pistons.

13. A method for feeding measured amounts of alumina to the break in the crust in an electrolytic cell which comprises: providing an alumina silo containing alumina to be fed to the cell; feeding alumina from said silo to a feed pipe communicating with said silo by means of an inlet opening in said pipe; providing an outlet opening on said feed pipe communicating with said cell; and transferring measured amounts of alumina from said inlet opening by means of a movable piston arrangement to said outlet opening for feeding to said cell, providing a feeding space defined by said piston arrangement, wherein a measured amount of alumina is fed to said feeding space in a first operative position of said piston arrangement and wherein said measured amount of alumina is fed from said feeding space to the cell via said outlet opening in a second operative position of said piston arrangement, wherein a measured amount of alumina is fed sequentially to two spaces defined by pistons and transferred from said spaces by movement of said pistons.

14. A method for feeding measured amounts of alumina to the break in the crust in an electrolytic cell which comprises: providing an alumina silo containing alumina to be fed to the cell; feeding alumina from said silo to a feed pipe communicating with said silo by means of an inlet opening in said pipe; providing an outlet opening on said feed pipe communicating with said cell; and transferring measured amounts of alumina from said inlet opening by means of a movable piston arrangement to said outlet opening for feeding to said cell, providing a feeding space defined by said piston arrangement, wherein a measured amount of alumina is fed to said feeding space in a first operative position of said piston arrangement and wherein said measured amount of alumina is fed from said feeding space to the cell via said outlet opening in a second operative position of said piston arrangement, wherein said piston is laterally movable within said feed pipe.

15. A method for feeding measured amounts of alumina to the break in the crust in an electrolytic cell which comprises: providing an alumina silo containing alumina to be fed to the cell; feeding alumina from said silo to a feed pipe communicating with said silo by means of an inlet opening in said pipe; providing an outlet opening on said feed pipe communicating with said cell; and transferring measured amounts of alumina from said inlet opening by means of a movable piston arrangement to said outlet opening for feeding to said cell, providing a feeding space defined by said piston arrangement, wherein a measured amount of alumina is fed to said feeding space in a first operative position of said piston arrangement and wherein said measured amount of alumina is fed from said feeding space to the cell via said outlet opening in a second operative position of said piston arrangement, wherein said piston is rotatably movable within said feed pipe.

* * * * *